United States Patent
Rakshit et al.

(10) Patent No.: US 12,095,411 B2
(45) Date of Patent: Sep. 17, 2024

(54) VARIABLE SOLAR PANEL ASSEMBLY

(71) Applicant: INTERNATIONAL BUSINESS MACHINES CORPORATION, Armonk, NY (US)

(72) Inventors: Sarbajit K. Rakshit, Kolkata (IN); Jagabondhu Hazra, Bangalore (IN); Manikandan Padmanaban, Chennai (IN); Marc Henri Coq, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/058,291

(22) Filed: Nov. 23, 2022

(65) Prior Publication Data
US 2024/0171119 A1   May 23, 2024

(51) Int. Cl.
*H02S 20/32*   (2014.01)
*G01S 3/786*   (2006.01)

(52) U.S. Cl.
CPC ............ *H02S 20/32* (2014.12); *G01S 3/7861* (2013.01)

(58) Field of Classification Search
CPC ................................ H02S 20/32; G01S 3/7861
See application file for complete search history.

(56) References Cited

U.S. PATENT DOCUMENTS

| | | | |
|---|---|---|---|
| 4,278,829 A | 7/1981 | Powell | |
| 4,296,732 A * | 10/1981 | Bernhardt | F24S 10/73 126/684 |
| 4,316,448 A | 2/1982 | Dodge | |
| 4,400,847 A * | 8/1983 | Farber | F24S 25/10 16/265 |
| 5,449,413 A * | 9/1995 | Beauchamp | G02B 5/282 359/359 |
| 5,487,791 A * | 1/1996 | Everman | B64G 1/222 244/172.6 |

(Continued)

FOREIGN PATENT DOCUMENTS

| | | |
|---|---|---|
| WO | 2009079261 A2 | 6/2009 |
| WO | 2015155771 A1 | 10/2015 |
| WO | 2016053215 A1 | 4/2016 |

OTHER PUBLICATIONS

Buckley, "Transparent Solar Panels and Quantum Dots will Harvest Energy on Architectual Scale", https://www.architectureanddesign.com.au/news/transparent-solar-panel . . . , Sep. 24, 2020, accessed Nov. 22, 2022, pp. 1-10.

(Continued)

*Primary Examiner* — Sadie White
(74) *Attorney, Agent, or Firm* — Tihon Poltavets

(57) ABSTRACT

A variable solar panel assembly includes a conventional solar panel, a mirror panel, and a transparent solar panel. The variable solar panel assembly is configured to reflect, by the mirror panel, light passing through the transparent solar panel towards the conventional solar panel. A method for managing an angle between the mirror panel and the conventional solar panel includes determining a position of a light source relative to a position of the variable solar panel assembly and adjusting the mirror panel to reflect light from the light source towards the conventional solar panel of the variable solar panel assembly.

14 Claims, 6 Drawing Sheets

(56) References Cited

U.S. PATENT DOCUMENTS

| | | | | | |
|---|---|---|---|---|---|
| 5,538,563 | A | * | 7/1996 | Finkl | H01L 31/0547 136/246 |
| 5,660,644 | A | * | 8/1997 | Clemens | F24S 20/50 136/246 |
| 5,977,478 | A | * | 11/1999 | Hibino | H01L 31/0547 126/684 |
| 10,581,370 | B2 | | 3/2020 | Bassi | |
| 10,921,028 | B2 | | 2/2021 | Dasgupta | |
| 11,146,209 | B2 | | 10/2021 | Chandan | |
| 2007/0199563 | A1 | * | 8/2007 | Fox | H01L 31/0547 126/684 |
| 2007/0240755 | A1 | * | 10/2007 | Lichy | F24S 23/10 136/246 |
| 2008/0216823 | A1 | | 9/2008 | Kmetovicz | |
| 2009/0199889 | A1 | * | 8/2009 | Willmott | H01L 31/02168 136/246 |
| 2009/0250099 | A1 | * | 10/2009 | Pan | H02S 40/44 136/248 |
| 2009/0314332 | A1 | * | 12/2009 | Barnett | G02B 27/1006 136/246 |
| 2010/0122722 | A1 | * | 5/2010 | Halpern | F24S 23/71 136/246 |
| 2010/0170557 | A1 | * | 7/2010 | Barnett | H01L 31/0549 136/244 |
| 2010/0193009 | A1 | * | 8/2010 | Wells | H01L 31/02167 136/246 |
| 2010/0206303 | A1 | * | 8/2010 | Thorne | H02S 20/32 126/696 |
| 2011/0061644 | A1 | * | 3/2011 | Pizzarello | H02S 40/22 126/714 |
| 2011/0226308 | A1 | * | 9/2011 | Pang | H02S 40/44 136/246 |
| 2013/0056045 | A1 | * | 3/2013 | Green | H01L 31/0525 136/246 |
| 2015/0288322 | A1 | * | 10/2015 | Beltran Albarran | H01L 31/0488 136/259 |
| 2016/0105145 | A1 | | 4/2016 | Drake | |
| 2016/0285411 | A1 | * | 9/2016 | Kirk | F24S 30/45 |
| 2017/0033733 | A1 | | 2/2017 | Chandan | |
| 2018/0248509 | A1 | | 8/2018 | Dayama | |
| 2020/0021237 | A1 | | 1/2020 | Bassi | |
| 2021/0265943 | A1 | * | 8/2021 | Severgnini | H02S 20/32 |

OTHER PUBLICATIONS

Renewable Snow, "Ubiquitous Energy certifies 9.8% efficiency for transparent solar cell", https://renewablesnow.com/news/ubiquitous-energy-certifies-98-efficie . . . , accessed Nov. 22, 2022, pp. 1-5.

Slaman et al., "Solar Collector Overheating Protection", Science Direct, www.sciencedirect.com, 2009 Elsevier, pp. 1-6.

Slauch et al., "Spectrally-Selective Mirrors with Combined Optical and Thermal Benefit for Photovoltaic Module Thermal Management", DOI: 10.1021/acsphotonics.7b01586, ACS Photonics, Mar. 2, 2018, pp. 1-35.

SolarFunda, "Transparent Solar Panels: Cost, Efficiency, Pros & Cons", https://solarfunda.com/transparent-solar-panels/, Jun. 3, 2021, pp. 1-17.

SolarMagazine, "Transparent Solar Panels: Reforming Future Energy Supply", https://solarmagazine.com/solar-panels/transparent-solar-panels/, Feb. 29, 2020, pp. 1-15.

* cited by examiner

VARIABLE SOLAR PANEL ASSEMBLY

BACKGROUND

This disclosure relates generally to solar panels, and in particular to solar panel assemblies with varying configurations.

A solar panel is an assembly of photovoltaic cells configured in a framework to utilize sunlight to generate electrical energy. A solar panel, often referred to as a photovoltaic module, includes a number of photovoltaic cells capable of converting the energy of light directly into electricity via the photovoltaic effect. A typical photovoltaic cell is non-transparent and generates electrical energy by absorbing visible light. Newer polymer solar cells, often referred to as photovoltaic glass, are transparent and generate electrical energy by absorbing invisible infrared light. Polymer solar cells allow for visible light to pass through, while being able to absorb infrared light to generate electrical energy.

Currently, when utilizing conventional solar panels, direct sunlight can result in overheating conditions on a surface of the conventional solar panels. Overheating conditions of the conventional solar panels results in a drastic efficiency drop, resulting in a loss of energy that would typically be gathered from the sunlight. Furthermore, utilizing mirrors to reflect sunlight towards a conventional solar panel, can rapidly raise temperatures on the surface of the conventional solar panel and can exceed optimal operating conditions for the conventional solar panel.

SUMMARY

One aspect of an embodiment of the present invention discloses an apparatus for a variable solar panel assembly, the apparatus comprising a conventional solar panel, a mirror panel, and a transparent solar panel. The variable solar panel assembly further comprising, the variable solar panel assembly configured to reflect, by the mirror panel, light passing through the transparent solar panel towards the conventional solar panel. An advantage of this embodiment includes the transparent solar panel filtering out infrared (IR) and ultraviolet (UV) spectrum waves and converting the IR and UV spectrum waves to electric energy, while reducing allowing visible light without heat content to pass towards the mirror panel and subsequently, the conventional solar panel. The apparatus can further include the conventional solar panel, the mirror panel, and the transparent solar panel configured in a triangular prism. An advantage of this embodiment includes a smaller packaging with a defined operational range for the triangular prism configuration of the variable solar panel assembly. The apparatus can further include a lower transparent solar panel configured to extend and retract beneath an upper transparent solar panel. An advantage of this embodiment includes the variable solar panel assembly being able to adjust an angle of the mirror panel with respect to the conventional solar panel by extending and retracting the lower transparent solar panel beneath the upper transparent solar panel, to maximize direct sunlight on a top surface of the conventional solar panel.

Another aspect of an embodiment of the present invention discloses a method for managing an angle between a mirror panel and a conventional solar panel, the method comprising determining a position of a light source relative to a variable solar panel assembly, wherein the variable solar panel assembly includes a conventional solar panel, a mirror panel, and a transparent solar panel. The method further comprising, adjusting the mirror panel to reflect light from the light source towards the conventional solar panel of the variable solar panel assembly. An advantage of this embodiment includes the transparent solar panel filtering out infrared (IR) and ultraviolet (UV) spectrum waves and converting the IR and UV spectrum waves to electric energy, while reducing allowing visible light without heat content to pass towards the mirror panel and subsequently, the conventional solar panel. The method can further include, wherein the light from the light source passes through the transparent solar panel of the solar assembly. An advantage of this embodiment includes the visible light passing through the transparent solar panel and reducing the heat generated by the IR and UV spectrum waves absorbed by the transparent solar panel upon reflecting off the mirror panel towards the conventional solar panel. The method can further include adjusting an angle at a hinge between the mirror panel and the conventional solar panel. An advantage of this embodiment includes optimizing the angle for the rays of light provided by a light source based on the angle at the hinge between the mirror panel and the conventional solar panel.

DETAILED DESCRIPTION

Figure 1:
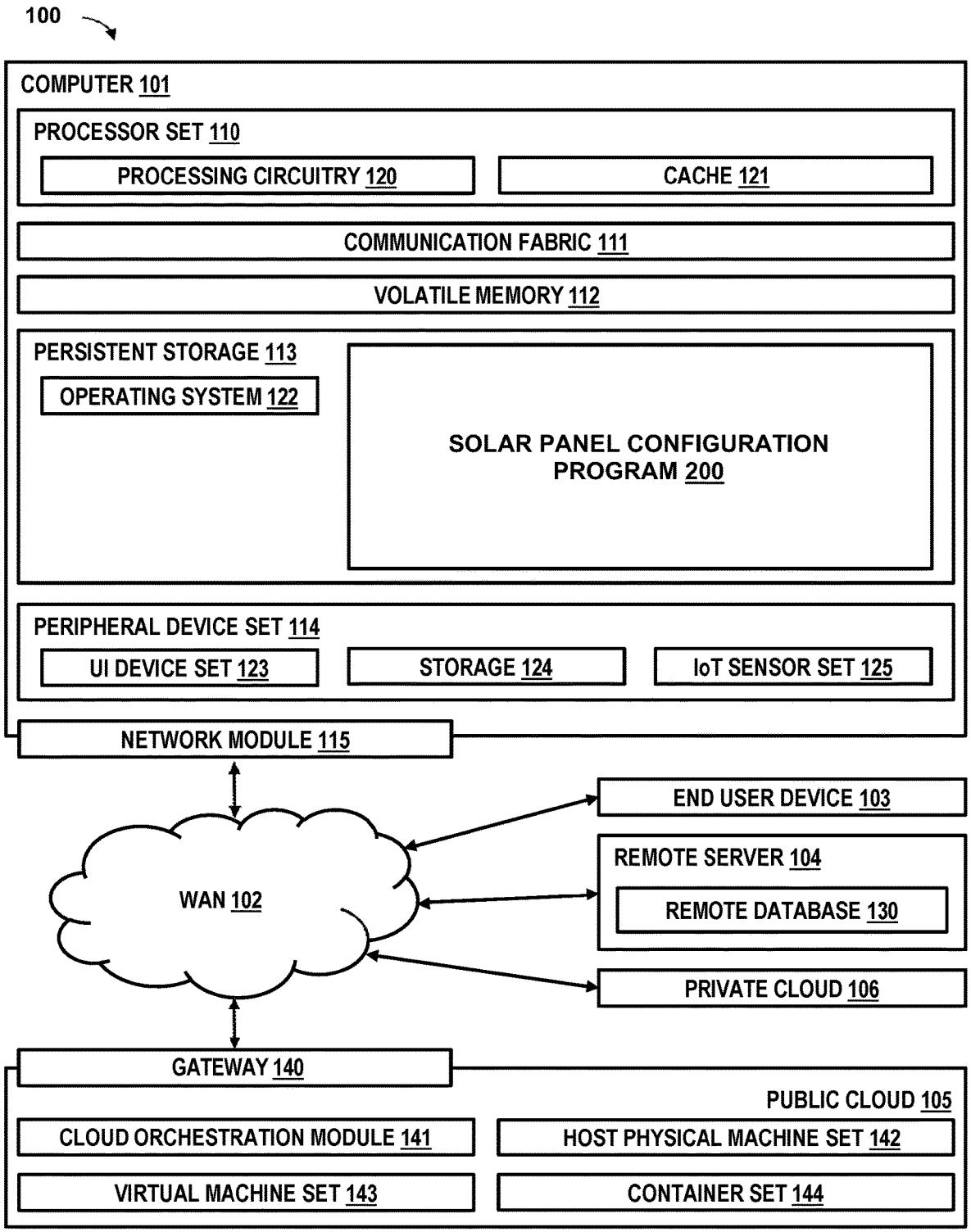
FIG. 1 is a functional block diagram illustrating a computing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a variable solar panel assembly with a number of advantages. A conventional solar panel utilizes visible light to generate electrical energy and typically produces manufacturer rated power at 25° C. If the conventional solar panel gets too hot (e.g., 70° C.), the conventional solar panel overheats, and efficiency is adversely impacted. Instances where a mirror panel is utilized to direct visible light towards the conventional solar panel, overheating can occur quicker due to the focused nature of the visible light, infrared (IR) spectrum waves, and ultraviolet (UV) spectrum waves on the conventional solar panel. A first advantage of the variable solar panel assembly includes a transparent solar panel absorbing the IR spectrum waves and UV spectrum waves prior to the IR spectrum waves and UV spectrum waves impacting and reflecting off the mirror panel towards the conventional solar panel. With the transparent solar panel absorbing the IR spectrum waves and UV spectrum waves, the amount of heat experienced by the conventional solar panel is reduced. A second advantage of the variable solar panel assembly includes the transparent solar panel generating electrical energy that would have otherwise been lost due to the conventional solar panel not being to covert the IR spectrum waves and UV spectrum waves. A third advantage of the variable solar panel assembly includes the conventional solar panel remaining under an ideal operational temperature range to efficiently covert visible light to electrical energy. A fourth advantage of the variable solar panel assembly includes the adjustability of a triangular prism configuration of the variable solar panel assembly that allows for the mirror panel to be positioned in a manner to optimize a light path towards the conventional solar panel.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as, solar panel configuration program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
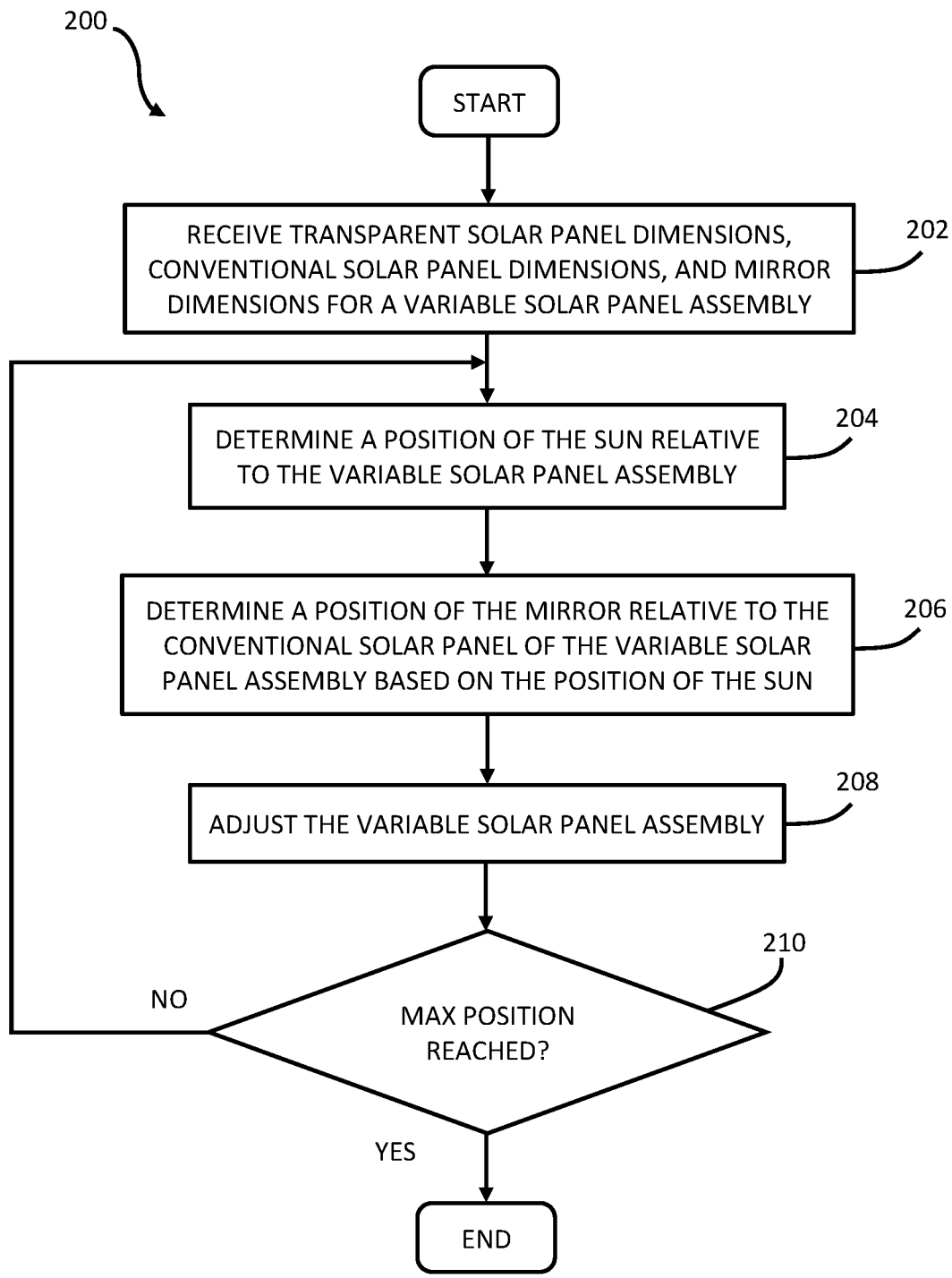
FIG. 2 depicts a flowchart of a solar panel configuration program for adjusting a variable solar panel assembly, in accordance with an embodiment of the present invention.

FIG. 2 depicts a flowchart of a solar panel configuration program for adjusting a variable solar panel assembly, in accordance with an embodiment of the present invention.

Solar panel configuration program 200 receives transparent solar panel dimensions, conventional solar panel dimensions, and mirror dimensions for a variable solar panel assembly (202). The variable solar panel assembly includes a transparent solar panel, a conventional solar panel, and a mirror panel configured in a triangular prism and is discussed in further detail with regards to FIGS. 3A and 3B. The dimensions for the conventional solar panel and the dimensions for the mirror panel are fixed with respect to the triangular prism configuration of the variable solar panel assembly. The transparent solar panel includes at least two separate panels, where at least one panel of the transparent solar panel extends and retracts beneath or top of at least one other panel of the transparent solar panel. As a result, the dimensions for the transparent solar panel are variable but the dimensions for each panel from the at least two separate panels of the transparent solar panel are fixed. Therefore, solar panel configuration program 200 can receive fixed dimensions for a conventional solar panel, fixed dimension for a mirror panel, and fixed dimensions for each panel of the transparent solar panel, along with variable dimensions for representing an operational range for the at least two separate panels of the transparent solar panel. In one embodiment, a transparent solar panel, a conventional solar panel, and a mirror panel share a common length, where a variable width of the transparent solar panel, a fixed width of the conventional solar panel, and a fixed width of the mirror panel form the triangle portion of the triangular prism. The conventional solar panel is positioned at the base of the triangle portion, with the transparent solar panel and the mirror panel forming the sides (i.e., legs).

In one example, solar panel configuration program 200 receives length A by width B for fixed dimensions of the conventional solar panel, length C by width D for fixed dimensions of the conventional solar panel, length E by width F for fixed dimensions of a first panel of the transparent solar panel, and length E by width G for fixed dimensions of a second panel of the transparent solar panel. Solar panel configuration program 200 also receives the variable dimensions for the transparent solar panel as length E by width $F \leq x \leq (F+G)$, where a width of the transparent solar panel varies between width F and width (F+G). In another example, solar panel configuration program 200 receives length A by width B for fixed dimensions of the conventional solar panel, length C by width D for fixed dimensions of the conventional solar panel, length E by width F for fixed dimensions of a first panel of the transparent solar panel, and length E by width G for fixed dimensions of a second panel of the transparent solar panel. Solar panel configuration program 200 also receives the variable dimensions for the transparent solar panel as length E by width F≤x≤(F+(G−I)), where a width of the transparent solar panel varies between width F and width (F+(G−I)) and width I represents a portion of the second panel of the transparent panel that does not fully extend beneath the first panel or covers a portion of the first panel.

Solar panel configuration program 200 determines a position of the sun relative to the variable solar panel assembly (204). Solar panel configuration program 200 utilizes a known position of the variable solar panel assembly to determine a position of the sun (i.e., light source) relative to the known position of the variable solar panel assembly, specifically the mirror panel that is to reflect sunlight towards a top surface of the conventional solar panel. In one embodiment, a variable solar panel assembly is in a fixed positioned, where the conventional solar panel (i.e., base) of the variable solar panel assembly remains in the fixed positioned. In another embodiment, a variable solar panel assembly is mounted to a rotational platform, where the conventional solar panel of the variable solar panel assembly is mounted to the rotational platform allowing for the variable solar panel assembly to rotate 360 degrees. Solar panel configuration program 200 can utilizes the known location for the variable solar panel assembly, a known time of the time, and a known travel path of the sun at the known location, to determine a current position of the sun relative to the variable solar panel assembly.

Solar panel configuration program 200 determines a position of the mirror relative to the conventional solar panel of the variable solar panel assembly based on the position of the sun (206). Solar panel configuration program 200 determines a position of the mirror panel relative to the conventional solar panel of the variable solar panel assembly to optimize the position of the mirror panel to maximize sun reflection towards the conventional solar panel. Solar panel configuration program 200 can utilize a predicted horizon optimization formula (i.e., Equation A), provided below:

$$J=\Sigma_{i=1}^{N} w_{\delta_i}(\delta_i^r - \delta_i^m)^2 + \Sigma_{i=1}^{N} w_{L_i}(A_i^r - A_i^m) f(\delta_i^m)))^2 + \Sigma_{i=1}^{N} w_{u\delta_i}(\Delta u)^2 + \Sigma_{i=1}^{N} w_{vL_i}(\Delta v)^2 \quad \text{Equation (A):}$$

The predicted horizon optimization formula is subject to $0 \leq \delta_i^m \leq \delta^{max}$ and $0 \leq A_i^m \leq A^{max}$. For the predicted horizon optimization, J represents a cost function over the receding horizon, $\delta_i^r$ represents an optimal mirror angle for the instant i, $\delta_i^m$ represents a selected mirror angle for instant i, $A_i^r$ represents an optimal surface area of transparent solar panel for instant i, $A_i^m$ represents a chosen surface of transparent solar panel for instant i, u represents mirror angle, v represents transparent solar panel surface area, $w_{\delta_i}$ represents weighting coefficient for mirror angle u, $w_{L_i}$ represents weighting coefficient for transparent solar panel surface area v, $w_{u\delta_i}$ represents a penalizing coefficient for large variations for mirror angle u, $w_{uL_i}$ represents a penalizing coefficient for large variations for transparent solar panel surface area v, $\delta^{max}$ represents a maximum limit for mirror angle u, and $A^{max}$ represents a maximum limit for transparent solar panel surface area v.

Solar panel configuration program 200 adjusts the variable solar panel assembly (208). Based on the predicted horizon optimization formula, solar panel configuration program 200 adjusts the variable solar panel assembly by altering an angle between the mirror panel and the conventional solar panel of the variable solar panel assembly. As the angle between the mirror panel and the conventional solar panel one or more panels of the transparent solar panel extend or retract to ensure the triangular prism form of the variable solar panel assembly is maintained. In addition to altering an angle between the mirror panel and the conventional solar panel of the variable solar panel assembly, solar panel configuration program 200 can adjust a rotational platform on which the variable solar panel assembly is mounted to direct the mirror panel of the variable solar panel assembly towards the sun. Solar panel configuration program 200 adjusts the variable solar panel assembly based on limitations defined for an operational range defined by the fixed dimensions and the variable dimensions for the transparent solar panel, the conventional solar panel, and the mirror panel.

Solar panel configuration program 200 determines whether a maximum position for the variable solar panel assembly is reached (decision 210). The maximum position for the variable solar panel assembly is based on limitations (i.e., maximum position and minimum position) for an operational range defined by the fixed dimensions and the variable dimensions for the transparent solar panel, the conventional solar panel, and the mirror panel. In one embodiment, the varying dimensions of the transparent solar panel that includes at least two individual panels provide the limitations for the operational range of the variable solar panel assembly. In another embodiment, a maximum angle between the mirror panel and the conventional solar panel provides the limitations for the operational range of the variable solar panel assembly, where interference between the various panels of the variable solar panel assembly prevent any further movement when the maximum angle is reached. In the event solar panel configuration program 200 determines the maximum position for the variable solar panel assembly was not reached ("no" branch, decision 210), solar panel configuration program 200 reverts to determining a position of the sun relative to the variable solar panel assembly. In the event solar panel configuration program 200 determines the maximum position for the variable solar panel assembly was reached ("yes" branch, decision 210), solar panel configuration program 200 ceases operations and places the solar panel assembly into a standby mode until subsequent following day.

Figure 3A:
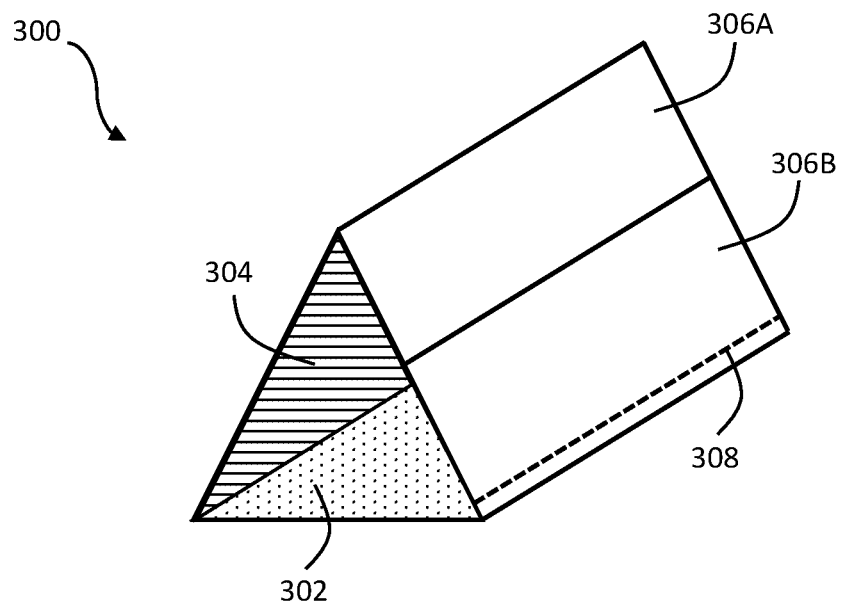
FIG. 3A depicts a three-dimensional view of a variable solar panel assembly in a retracted position, in accordance with an embodiment of the present invention.

FIG. 3A depicts a three-dimensional view of a variable solar panel assembly in a retracted position, in accordance with an embodiment of the present invention. Variable solar panel assembly 300 includes conventional solar panel 302, mirror panel 304, and transparent solar panel 306A and 306B configured in a triangular prism. In this embodiment, transparent solar panel 306A represents a lower transparent solar panel and transparent solar panel 306B represents an upper transparent solar panel. Conventional solar panel 302 represents an assembly of photovoltaic solar cells that are non-transparent and generate electric energy by absorbing visible light. Transparent solar panel 306A and 306B represent polymer solar cells, often referred to as photovoltaic glass, that are transparent and generate electrical energy by absorbing invisible infrared light. Polymer solar cells allow for a portion of visible light to pass through, while being able to absorb infrared light to generate electrical energy. Conventional solar panel 302 is coupled and hinged to mirror panel 304, transparent solar panel 306A is coupled and hinged to mirror panel 302, and transparent solar panel 306B is coupled and hinged to conventional solar panel 306. For discussion purposed, a width side of conventional solar panel 302, mirror panel 304, and transparent solar panel 306A and 306B form the triangle portion of the triangular prism. The length side of conventional solar panel 302, mirror panel 304, and transparent solar panel 306A and 306B represents the depth of the triangular prism. In this embodiment, the length of conventional solar panel 302, mirror panel 304, and transparent solar panel 306A and 306B is equal.

A first length side of conventional solar panel 302 is coupled and hinged to a first length side of mirror panel 304, where an operational angle at the hinge is defined by a minimum and a maximum extension distance between transparent solar panel 306A and 306B. A second length side of mirror panel 304 is coupled and hinged to a first length side of transparent solar panel 306A, where an operational angle at the hinge is defined by a minimum and a maximum extension distance between transparent solar panel 306A and 306B. A second length side of conventional solar panel 302 is coupled and hinged to a first length side of transparent solar panel 306B, where an operational angle at the hinge is defined by a minimum and a maximum extension distance between transparent solar panel 306A and 306B. In this embodiment, transparent solar panel 306A is coupled to transparent solar panel 306B, where transparent solar panel 306A is configured to extend and retract beneath transparent solar panel 306B. In another embodiment, transparent solar panel 306A is coupled to transparent solar panel 306B, where transparent solar panel 306A is configured to extend and retract on top of (i.e., above) transparent solar panel 306B. Transparent solar panel 306A and 306B can have varying degrees of transparency. In one example, transparent solar panel 306A is 80% transparent and transparent solar panel 306B is 70% transparent, where 80% of light can pass through transparent solar panel 306A towards mirror panel 304 and 70% of light can pass through transparent solar panel 306B towards mirror panel 304. Portions of transparent solar panel 306A and 306B that overlap have a calculated light transparency that is below 70% due to the light having to pass through both transparent solar panel 306A and 306B, thus increasing the amount of light absorption. Edge 308 represents a length side of transparent solar panel 306A and illustrates a portion of transparent solar panel 306A that is retracted under transparent solar panel 306B.

Figure 3B:
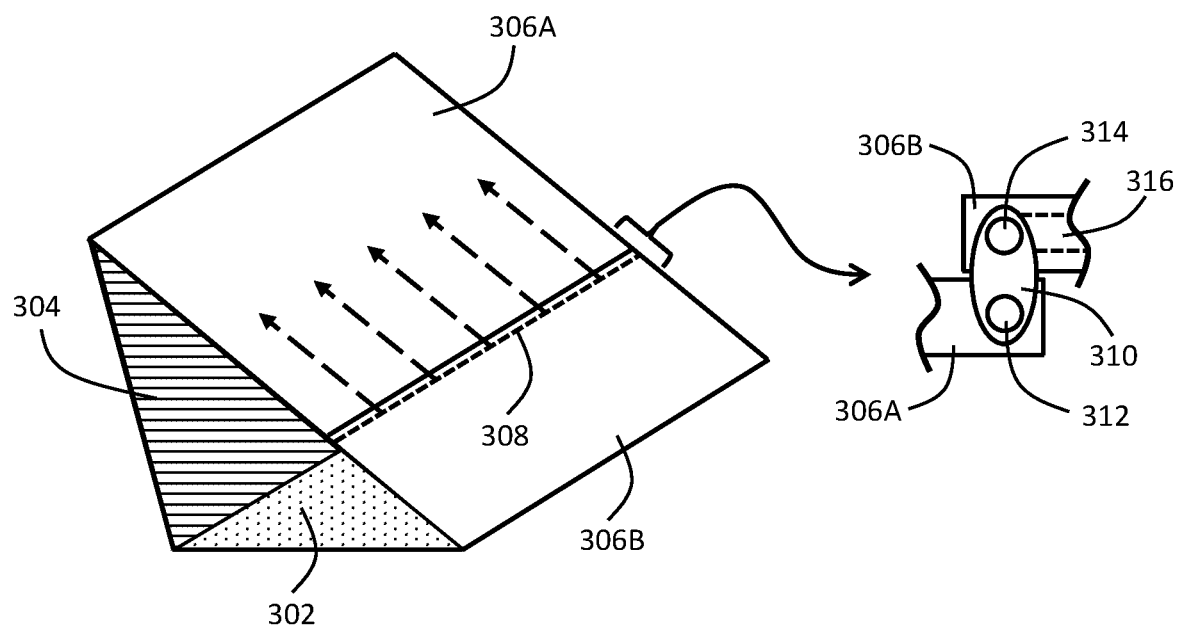
FIG. 3B depicts a three-dimensional view of a variable solar panel assembly in an extended position, in accordance with an embodiment of the present invention.

FIG. 3B depicts a three-dimensional view of a variable solar panel assembly in an extended position, in accordance with an embodiment of the present invention. As transparent solar panel 306A extends from beneath transparent solar panel 306B, edge 308 of transparent solar panel 306A approaches a visible edge (i.e., a second length side) of transparent solar panel 306B and an angle between conventional solar panel 302 and mirror panel 304 increases. Edge 308 of transparent solar panel 306A can include a protruding lip to engage with a protruding lip on the visible edge of transparent solar panel 306B to prevent transparent solar panel 306A from extending beyond the visible edge of transparent solar panel 306B, discussed in further detail with regards to FIG. 5A. In this embodiment, transparent solar panel 306A is coupled to transparent solar panel 306B utilizing a bracket assembly that includes plate 310, lower pin 312, and upper pin 314 positioned at each end of the width side of transparent solar panel 306A and 306B. Lower pin 312 mechanically couples a first end of the width side of transparent solar panel 306A to a first aperture of plate 310, through which lower pin 312 passes through. Upper pin 314 passes through a second aperture of plate 310 and is disposed in channel 316 on a first width side of transparent solar panel 306B, where upper pin 314 slides in a direction defined by channel 316. The sliding motion of upper pin 314 in channel 316 allows for transparent solar panel 306A to extend and retract beneath transparent solar panel 306B. To facilitate the sliding motion in channel 316, upper pin 314 can pass through a bearing that is disposed within channel 316 to allow upper pin 314 to slide in the direction defined by channel 316. It is to be noted, the bracket assembly is positioned on each side of transparent solar panel 306A and 306B.

Figure 4A:
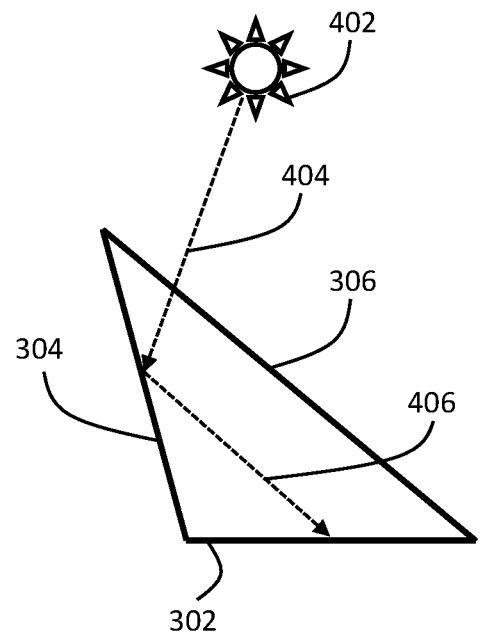
FIG. 4A depicts a side view of a variable solar panel assembly for mirror angle estimation to maximize conventional solar panel illumination, in accordance with an embodiment of the present invention.

FIG. 4A depicts a side view of a variable solar panel assembly for mirror angle estimation to maximize conventional solar panel illumination, in accordance with an embodiment of the present invention. For discussion purposes, transparent solar panel 306 represents a simplified view of transparent solar panel 306A and transparent solar panel 306B. As visible light, represented by incoming ray 404, from light source 402 passes through transparent solar panel 306, the visible light is reflected by mirror panel 304, represented by reflected ray 406, towards a top surface of conventional solar panel 302. Transparent solar panel 306 represents a polymer solar panel or another transparent solar panel known in the art capable of capturing infrared light and generating electrical energy. A transparency level (e.g., 70%) of transparent solar panel 306 is such that a portion of the visible light (i.e., incoming ray 404) can pass through transparent solar panel 306, impact mirror panel 304, and reflect off mirror panel 304 (i.e., reflected ray 406) towards conventional solar panel 302 with upward facing photovoltaic cells.

Figure 4B:
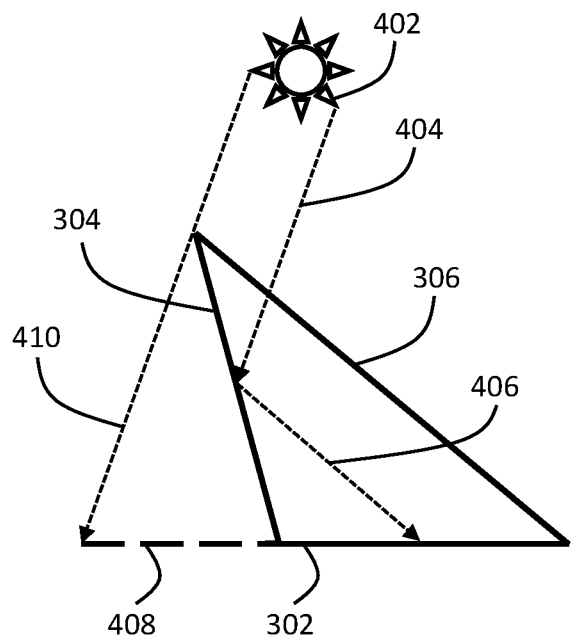
FIG. 4B depicts a side view of a variable solar panel assembly for mirror angle estimation to minimize shaded regions, in accordance with an embodiment of the present invention.

FIG. 4B depicts a side view of a variable solar panel assembly for mirror angle estimation to minimize shaded regions, in accordance with an embodiment of the present invention. To maximize conventional solar panel illumination and minimize shaded regions created by mirror panel 304, solar panel configuration program 200 determines a reflected profile by identifying coordinates for end points of the reflection impact the conventional solar panel (i.e., reflected ray 406). Solar panel configuration program 200 determines shadow profile 408 caused by light source 402 by extending incident vector 410 and identifying a coordinate for where incident vector 410 contacts the ground. Solar panel configuration program 200 performs minor alterations to the angle between conventional solar panel 302 and mirror panel 304 utilizing a predicted horizon optimization formula, such as, equation A previously discussed with regards to FIG. 2.

Figure 5A:
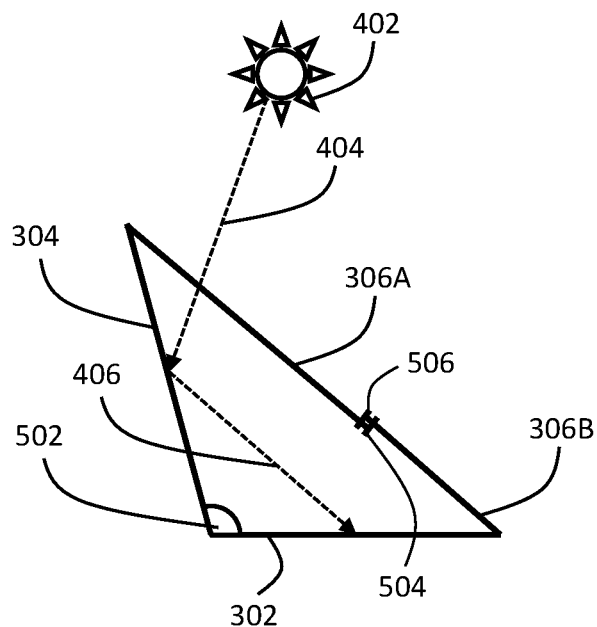
FIG. 5A depicts a side view of a variable solar panel assembly in an extended position, in accordance with an embodiment of the present invention.

FIG. 5A depicts a side view of a variable solar panel assembly in an extended position, in accordance with an embodiment of the present invention. In this example, light source 402 is positioned at a greater angle from the horizon, therefore solar panel configuration program 200 extends transparent solar panel 306A to a maximum position relative to transparent solar panel 306B. Interference lip 504 of transparent solar panel 306A interacts with interference lip 506 of transparent solar panel 306B when the maximum position is reached, where interference lip 504 and 506 prevent transparent solar panel 306A from extending beneath transparent solar panel 306B beyond a certain point. Solar panel configuration program 200 increases angle 502 between mirror panel 304 and conventional solar panel 302 to ensure incoming ray 404 impacting mirror panel 304 creates reflected ray 406 to maximize light coverage impacting a top surface of conventional solar panel 302.

Figure 5B:
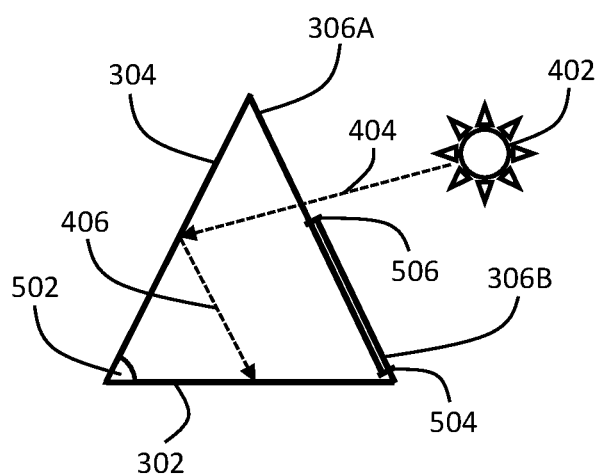
FIG. 5B depicts a side view of a variable solar panel assembly in a retracted position, in accordance with an embodiment of the present invention.

FIG. 5B depicts a side view of a variable solar panel assembly in a retracted position, in accordance with an embodiment of the present invention. In this example, light source 402 is positioned at a lower angle from the horizon, therefore solar panel configuration program 200 retracts transparent solar panel 306A to a minimum position relative to transparent solar panel 306B. Solar panel configuration program 200 decreases angle 502 between mirror panel 304 and conventional solar panel 302 to ensure incoming ray 404 impacting mirror panel 304 creates reflected ray 406 to maximize light coverage impacting a top surface of conventional solar panel 302. In the minimum position, interference lip 504 of transparent solar panel 306A is at a position furthest from interference lip 506 of transparent solar panel 306B.

Figure 6A:
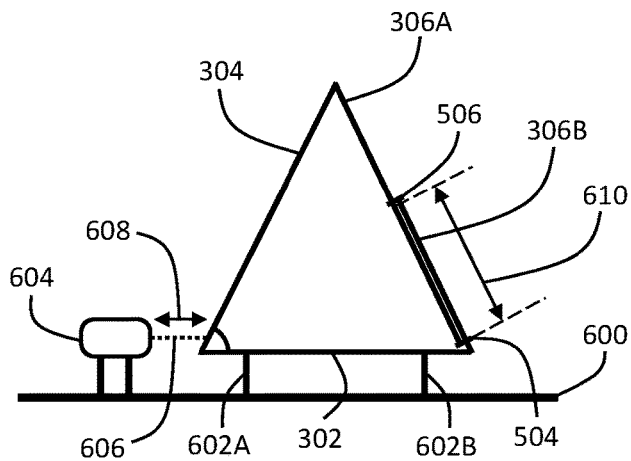
FIG. 6A depicts a side view of a variable solar panel assembly in a retracted position with an arm mechanism to control a position of a mirror, in accordance with an embodiment of the present invention.

FIG. 6A depicts a side view of a variable solar panel assembly in a retracted position with an arm mechanism to control a position of a mirror, in accordance with an embodiment of the present invention. In this embodiment, conventional solar panel 302 is positioned over ground surface 600 with beam 602A and 602B supporting the variable solar panel assembly. A first end of beam 602A and 602B is coupled to an outer surface of conventional solar panel 302 and a second end of beam 602A and 602B is disposed on and/or into ground surface 600, providing the support to the variable solar panel assembly. As previously discussed, a first length side of conventional solar panel 302 is coupled and hinged to a first length side of mirror panel 304, where an operational angle at the hinge is defined by a minimum and a maximum extension distance between transparent solar panel 306A and 306B. A second length side of mirror panel 304 is coupled and hinged to a first length side of transparent solar panel 306A, where an operational angle at the hinge is defined by a minimum and a maximum extension distance between transparent solar panel 306A and 306B. A second length side of conventional solar panel 302 is coupled and hinged to a first length side of transparent solar panel 306B, where an operational angle at the hinge is defined by a minimum and a maximum extension distance between transparent solar panel 306A and 306B. Mechanism 604 is configured to control a directional movement of arm 606 illustrated by arrows 608, to alter an angle between mirror panel 304 and conventional solar panel 302 of the variable solar panel assembly. A first end of arm 606 is coupled to mechanism 604 and a second end of arm 606 is coupled to an outer surface of mirror panel 304. In this embodiment, mechanism 604 has extended arm 606 into a maximum position, fully retracting transparent solar panel 304A beneath transparent solar panel 306B and creating a minimum angle at the hinge between conventional solar panel 302 and mirror panel 304. Length 610 represents an operational range for which transparent solar panel 306A can extend and retract from beneath transparent solar panel 306B, where interference lip 504 and 506 provide the minimum and maximum limits of length 610 for transparent solar panel 306B.

Figure 6B:
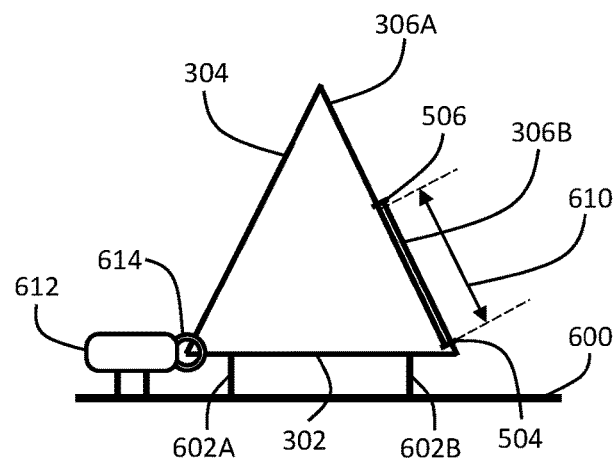
FIG. 6B depicts a side view of a variable solar panel assembly in a retracted position with a rotational mechanism to control a position of a mirror, in accordance with an embodiment of the present invention.

FIG. 6B depicts a side view of a variable solar panel assembly in a retracted position with a rotational mechanism to control a position of a mirror, in accordance with an embodiment of the present invention. In this embodiment, conventional solar panel 302 is positioned over ground surface 600 with beam 602A and 602B supporting the variable solar panel assembly. A first end of beam 602A and 602B is coupled to an outer surface of conventional solar panel 302 and a second end of beam 602A and 602B is disposed on and/or into ground surface 600, providing the support to the variable solar panel assembly. As previously discussed, a first length side of conventional solar panel 302 is coupled and hinged to a first length side of mirror panel 304, where an operational angle at the hinge is defined by a minimum and a maximum extension distance between transparent solar panel 306A and 306B. A second length side of mirror panel 304 is coupled and hinged to a first length side of transparent solar panel 306A, where an operational angle at the hinge is defined by a minimum and a maximum extension distance between transparent solar panel 306A and 306B. A second length side of conventional solar panel 302 is coupled and hinged to a first length side of transparent solar panel 306B, where an operational angle at the hinge is defined by a minimum and a maximum extension distance between transparent solar panel 306A and 306B. Mechanism 612 controls gear 614 to alter a position of mirror panel 304 with respect to conventional solar panel 302 of the variable solar panel assembly. Gear 614 is mechanically coupled to a hinge that couples conventional solar panel 302 to mirror panel 304, where mechanism 612 is configured to rotates gear 614 to control the hinge and angle between conventional solar panel 302 and mirror panel 304. Length 610 represents an operational range for which transparent solar panel 306A can extend and retract from beneath transparent solar panel 306B, where interference lip 504 and 506 provide the minimum and maximum limits of length 610 for transparent solar panel 306B.

Figure 7:
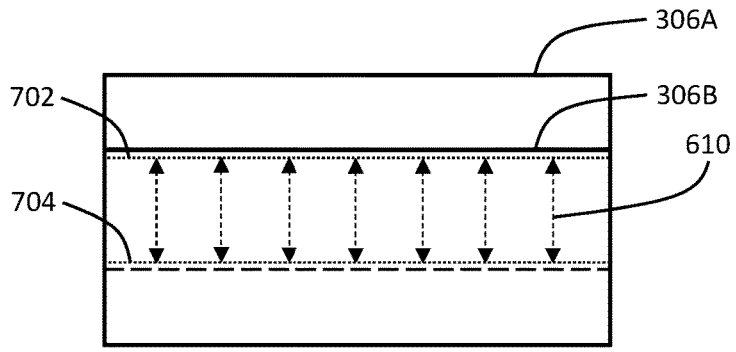
FIG. 7 depicts a top view of a transparent solar panel portion of a variable solar panel assembly, in accordance with an embodiment of the present invention.

FIG. 7 depicts a top view of a transparent solar panel portion of a variable solar panel assembly, in accordance with an embodiment of the present invention. The top view of transparent solar panel 306A and 306B illustrates length 610 representing the operational range for range for which transparent solar panel 306A can extend and retract from beneath transparent solar panel 306B. Since a thickness of interference lip 504 and 506 (not illustrated in FIG. 7) restrict an extension and retraction of transparent solar panel 306A relative to transparent solar panel 306B, upper limit line 702 and lower limit line 704 define the true operational length for the extension and retraction of transparent solar panel 306A relative to transparent solar panel 306B.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for an adjustable solar panel assembly, the apparatus comprising:
   a non-transparent solar panel, a mirror panel, an upper transparent solar panel, and a lower transparent solar panel, wherein the non-transparent solar panel, the mirror panel, and the lower transparent solar panel positioned at least partially beneath the upper transparent solar panel are configured in a triangular prism, wherein the non-transparent solar panel is a first side of the triangle prism, the mirror panel is a second side of the triangle prism, and the lower transparent solar panel positioned at least partially beneath the upper transparent solar panel is a third side of the triangle prism; and
   the adjustable solar panel assembly configured to reflect, by the mirror panel, light passing through the upper transparent solar panel and the lower transparent solar panel towards the non-transparent solar panel, wherein an angle between the third side of the triangle prism and second side of the triangle prism is adjustable.

2. The apparatus of claim 1, wherein the lower transparent solar panel is configured to extend and retract beneath the upper transparent solar panel.

3. The apparatus of claim 2, wherein an angle between the non-transparent solar panel and the mirror panel defines a distance of extension and retraction of the lower transparent solar panel from beneath the upper transparent solar panel.

4. The apparatus of claim 1, wherein a width of the non-transparent solar panel, a width of the mirror panel, and a width of the upper transparent solar panel define a triangular portion of the triangular prism.

5. The apparatus of claim 4, wherein a first length of the non-transparent solar panel is coupled and hinged to a first length of the mirror panel, a second length of the non-transparent solar panel is coupled to and hinged to a first length of the upper transparent solar panel, and a second length of the mirror panel is coupled to and hinged to a first length of the lower transparent solar panel.

6. The apparatus of claim 5, wherein the upper transparent solar panel is coupled to the lower transparent solar panel.

7. The apparatus of claim 6, wherein the lower transparent solar panel is configured to extend and retract beneath the upper transparent solar panel.

8. The apparatus of claim 7, wherein the upper transparent solar panel is coupled to the lower transparent solar panel utilizing a bracket assembly.

9. The apparatus of claim 8, wherein the lower transparent solar panel mechanically coupled to the bracket assembly via a first pin and the upper transparent solar panel mechanically coupled to the bracket assembly via a second pin.

10. The apparatus of claim 9, wherein the second pin is configured to slide in a channel of the upper transparent solar panel.

11. The apparatus of claim 10, wherein the bracket assembly is positioned on a first width side of the upper transparent solar panel and a first width side of the lower transparent solar panel.

12. The apparatus of claim 10, wherein the second pin is coupled to a bearing to facilitate a sliding motion of the second pin in the channel of the upper transparent solar panel.

13. The apparatus of claim 5, wherein an operational angle of a first hinge between the non-transparent solar panel and the mirror panel is defined by a minimum and a maximum distance of extension of the lower transparent solar panel with respect to the upper transparent solar panel.

14. The apparatus of claim 13, wherein an operational angle of a second hinge between the non-transparent solar panel and the upper transparent solar panel is defined by the minimum and the maximum distance of extension of the lower transparent solar panel with respect to the upper transparent solar panel.

\* \* \* \* \*